A. L. SESSIONS.
HAND WHEEL FOR VALVES AND LIKE ARTICLES.
APPLICATION FILED MAR. 24, 1909.
1,080,080.
Patented Dec. 2, 1913.
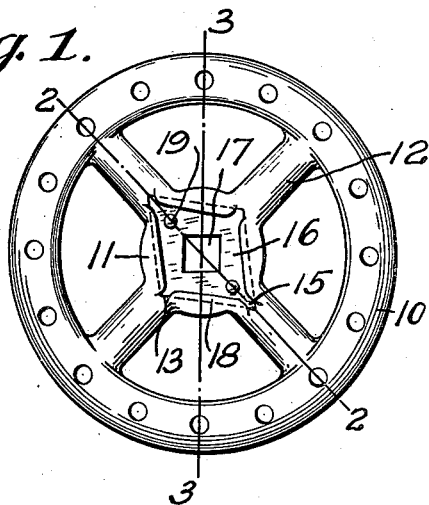
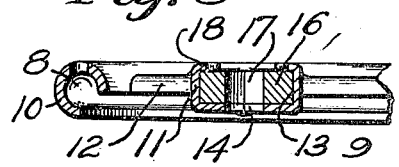
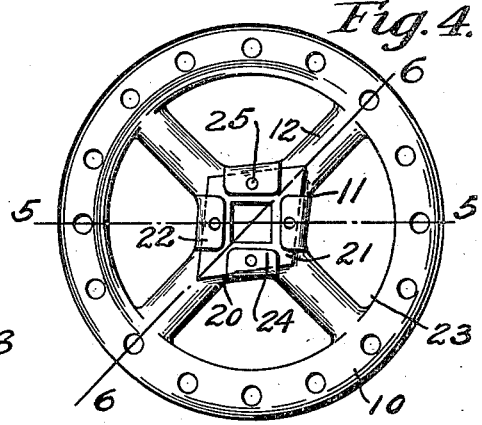
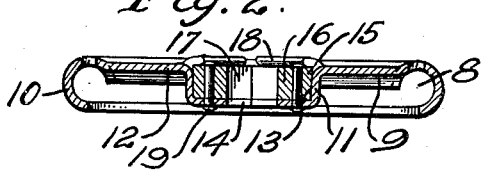
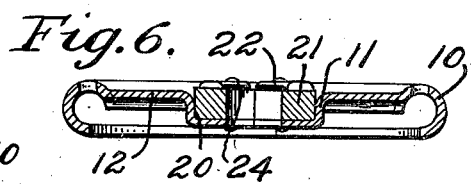
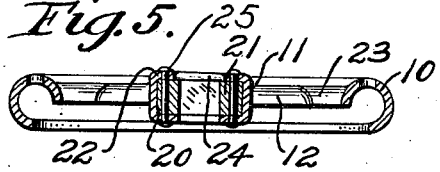
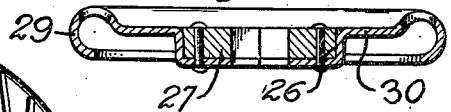
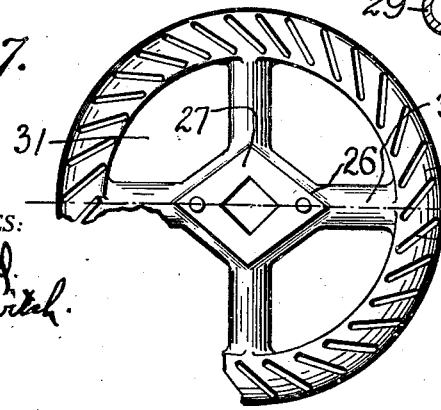
WITNESSES:
INVENTOR.
Albert L. Sessions,
BY
Arthur B. Jenkins,
ATTORNEY.

UNITED STATES PATENT OFFICE.

ALBERT L. SESSIONS, OF BRISTOL, CONNECTICUT.

HAND-WHEEL FOR VALVES AND LIKE ARTICLES.

1,080,080.

Specification of Letters Patent. Patented Dec. 2, 1913.

Application filed March 24, 1909. Serial No. 485,370.

*To all whom it may concern:*

Be it known that I, ALBERT L. SESSIONS, a citizen of the United States, and a resident of Bristol, in the county of Hartford and State of Connecticut, have invented a new and Improved Hand-Wheel for Valves and like Articles, of which the following is a specification.

My invention relates to the class of devices more especially used for turning the spindles of valves and the like, and the object of the invention is to provide a device of this kind having novel features of advantage and utility.

Various forms of construction each embodying my invention and in the use of which the objects sought may be attained are illustrated in the accompanying drawings, in which—

Figure 1 is a plan view of a wheel embodying my invention. Fig. 2 is a view in cross-section through the same on plane denoted by dotted line 2—2 of Fig. 1. Fig. 3 is a like view, the plane of section being denoted by dotted line 3—3 of Fig. 1. Fig. 4 is a plan view of a wheel embodying a modified form of construction. Figs. 5 and 6 are section views on planes respectively denoted by dotted lines 5—5 and 6—6 of Fig. 4. Fig. 7 is a plan view of a wheel embodying a slightly different form of construction. Fig. 8 is a view in central depthwise section through the device shown in Fig. 7.

The construction herein illustrated and described embodies an extremely light and at the same time sufficiently strong device for the uses to which it is subjected. The wheel while being constructed of sheet material, preferably metal, may be readily formed as to the principal part as by being struck to shape in dies.

In the accompanying drawings the numeral 10 denotes the rim of the wheel which is preferably of concaved annular shape, 11 the hub portion and 12 arms uniting the hub and rim. These parts are all preferably formed of a single piece of metal stamped to shape, the arms and rim, either or all, preferably being concaved in order to provide the greatest strength, the numeral 9 denoting the groove in the arms and the numeral 8 the groove in the rim. A recess 13 is formed in the hub, by depressing the metal forming the hub and an opening 14 extends through the wall which forms the bottom of this recess. In the form of construction shown in Figs. 1 to 3, this recess is of diamond shape, the ends 15 extending partially into the arms. A filling is placed within this recess, this filling preferably consisting of a piece of metal 16 having a square opening 17 to receive the spindle of a valve or like part. The opening 14 in the wall forming the bottom of the recess and the opening 17 are preferably of the same size and shape, as square, but any non-circular form may be given to this opening. This filling is made to closely fit the recess, thereby providing a strengthening member for this part of the wheel, and it may be held in place in any suitable manner. In the form of construction shown in Fig. 1 the edges of the hub are pressed to overlie the filling, this operation forming lips 18 at the edges of the recess. Rivets 19 may also be employed, extending through the filling into the metal of the hub directly underneath the recess to aid in firmly securing the parts together. It will be understood, however, that the invention contemplates the use of either of these fastening means alone or combined, as may be desired.

In the form of structure shown in Figs. 4 to 6 the rim 10, hub 11 and arms 12 are of the same general construction as hereinabove described. A recess 20 is formed in the hub as hereinbefore described with respect to the other form of the device, and a filling 21 is located within this recess. Instead, however, of squeezing the edges of the recess over the filling, plates 22 formed from metal from between the arms 12 are bent over to form lips 24. This metal is closely pressed against the filling and serves to firmly hold the latter in place within the recess. Rivets 25 may be employed if desired to hold the parts firmly together, these rivets extending through the metal at the bottom of the recess and also through the lips 24.

While I have shown and described herein certain constructions embodying my invention, I contemplate other structures as within the scope and intent of the invention, and I do not therefore limit myself to the exact construction of parts herein illustrated and described.

In a slightly different form of construction shown in Figs. 7 and 8 the rim is constructed as hereinbefore described and the hub is depressed to form a recess 26. The filling 27 is located in this recess as hereinbefore described, this filling being held in place by any suitable means. In this form of the device, however, it is preferred to use rivets only for securing the filling in place. The hub and rim 29 are joined by arms 30 with openings 31 therebetween. In this as in the structure shown in the other figures, openings are formed through the rim for the purpose of securing lightness but mainly for providing means to prevent undue heating of the rim. These openings 32 are of rectangular form, whereas in the figures hereinbefore described the openings are shown as round.

I claim—

1. A hand wheel including a rim, arms extending laterally each of another, and a hub having a recess formed by depressing the metal forming the hub and said arms being strengthened by forming them curved in cross section, all of said parts being formed of a single piece of sheet metal, and a filling secured within the recess in the hub.

2. A hand wheel formed of sheet metal and including a rim of curved form, arms extending laterally each of another bent to curved form and of uniform shape in cross section from end to end, and a hub having a recess formed by depressing the metal forming the hub, said wheel also including a filling secured within said recess and having an opening for the reception of a spindle.

3. A hand wheel composed of a single piece of sheet material and having a rim, arms and a hub, the latter being formed to provide a recess, a filling located within said recess, and lips integrally formed from the metal composing the wheel to hold the filling on all sides and overlying the filling to retain it in place.

4. A hand wheel formed of a single piece of sheet material and including a rim, arms and a hub, the latter having a recess extending into the arms, a filling closely fitting said recess and extending into said arms, and means for holding the filling in place.

5. A hand wheel composed of sheet material and including a rim, arms and hub, the latter having a recess formed therein, a filling of solid material located within said recess, and lips formed at the upper edge of the recess and located on all sides of and overlying said filling to hold it in place, the wall forming the bottom of said recess and said lips being formed of the same piece of metal.

ALBERT L. SESSIONS.

Witnesses:
ARTHUR B. JENKINS,
LENA E. BERKOVITCH.